(12) United States Patent
Liao et al.

(10) Patent No.: US 7,688,329 B2
(45) Date of Patent: Mar. 30, 2010

(54) PIXEL COLOR CONVERSION METHOD AND SYSTEM APPLIED TO OUTPUT DEVICE

(75) Inventors: Wu-Jie Liao, Changhua County (TW); Meng-Yun Ying, Taipei (TW)

(73) Assignee: Primax Electronics Ltd., Neihu, Taipei (TW)

( * ) Notice: Subject to any disclaimer, the term of this patent is extended or adjusted under 35 U.S.C. 154(b) by 685 days.

(21) Appl. No.: 11/521,581

(22) Filed: Sep. 15, 2006

(65) Prior Publication Data

US 2007/0268303 A1  Nov. 22, 2007

(30) Foreign Application Priority Data

May 19, 2006  (TW) .............................. 95117796 A

(51) Int. Cl.
*G09G 5/02* (2006.01)
(52) U.S. Cl. .................. 345/589; 345/590; 358/1.9
(58) Field of Classification Search .......... 345/581, 345/589, 595; 382/155, 159, 162, 167, 209; 358/1.1, 1.9, 2.1, 518, 520, 521, 523, 524
See application file for complete search history.

(56) References Cited

U.S. PATENT DOCUMENTS

| | | | |
|---|---|---|---|
| 7,136,710 B1* | 11/2006 | Hoffberg et al. | 700/83 |
| 7,515,299 B2* | 4/2009 | Asano | 358/1.9 |
| 2004/0263880 A1* | 12/2004 | Ito et al. | 358/1.9 |
| 2005/0237554 A1* | 10/2005 | Yoda | 358/1.9 |
| 2006/0257015 A1* | 11/2006 | Katahata et al. | 382/145 |

* cited by examiner

*Primary Examiner*—Ulka Chauhan
*Assistant Examiner*—Donna J Ricks
(74) *Attorney, Agent, or Firm*—Winston Hsu

(57) ABSTRACT

A pixel color conversion method applied to an output device includes: providing a trainable database for storing a plurality of data values corresponding to a set of indexes for use performing pixel color conversion; regarding at least one source image, training the trainable database; and according to the plurality of data values corresponding to the set of indexes in the trainable database, converting source samples of a source image into target samples for being outputted by the output device.

4 Claims, 15 Drawing Sheets

(5 of 15 Drawing Sheet(s) Filed in Color)

PIXEL COLOR CONVERSION METHOD AND SYSTEM APPLIED TO OUTPUT DEVICE

BACKGROUND OF THE INVENTION

1. Field of the Invention

The present invention relates to output devices of images/video signals, and more particularly, to pixel color conversion methods and systems applied to output devices.

2. Description of the Prior Art

A printer such as an inkjet printer is capable of respectively spraying small ink droplets corresponding to specific amounts on a plurality of locations on a paper to display color and/or gray level variations of a whole image to be outputted. A typical inkjet printer or a typical multi-function printer (MFP) of the like may have a plurality of ink colors such as cyan (C), magenta (M), yellow (Y), and black (K) and may spray ink droplets corresponding to specific (C, M, Y, K) proportions on a specific location of a paper to display the color of the specific location, where blue can be displayed by utilizing cyan ink and magenta ink, red can be displayed by utilizing magenta ink and yellow ink, and green can be displayed by utilizing yellow ink and cyan ink, and theoretically, black can be displayed by utilizing cyan ink, magenta ink, and yellow ink.

On a specific location, if a certain color of ink within the cyan ink, the magenta ink, the yellow ink, and the black ink mentioned above is sprayed in excess, for example, a proportion of the certain color of ink is greater than a specific proportion, problems such as saturation may occur, which means no matter how much of the certain color of ink is increased, the color is substantially unvaried for the perception of human eyes. Similar situations may also occur regarding a laser printer. When a color laser printer applies too much toner powder corresponding to a certain color to a specific location on a paper, problems such as saturation may occur.

According to the related art, technologies such as gray component replacement (GCR) and under color removal (UCR) can be utilized for controlling the total regional ink amount or the total regional toner powder amount on the paper, where the GCR technology replaces at least one portion of colors representing details and shadows with black, while the UCR technology removes neutral gray generated by mixing cyan, magenta, and yellow in the dark portion and replaces the neutral gray by applying a proper amount of black.

It is noted that according to the related art, it is supposed that the problems mentioned above can be solved by color replacement, so the output results thereof sometimes seem to be flat or unreal in the dark portion. In addition, the output effects generated by color replacement according to the related art may vary with respect to different kinds of papers and/or different kinds of images. As a result, even after many times of adjustment or calibration, the side effects due to color replacement may still exist. Therefore, the related art does not provide a real solution to the problems mentioned above.

SUMMARY OF THE INVENTION

It is therefore an objective of the claimed invention to provide pixel color conversion methods and systems applied to output devices to solve the above-mentioned problem.

It is another objective of the claimed invention to provide pixel color conversion methods and systems applied to output devices, in order to optimize the pixel color conversion function of the output devices by utilizing a trainable database.

It is another objective of the claimed invention to provide pixel color conversion methods and systems applied to output devices, in order to achieve very high efficiency of adjusting or calibrating the pixel color conversion ability of the output devices by automating the training of a trainable database.

According to one embodiment of the claimed invention, a pixel color conversion method applied to an output device is disclosed. The pixel color conversion method comprises: providing a trainable database for storing a plurality of data values corresponding to a set of indexes for use performing pixel color conversion; and regarding at least one source image, training the trainable database. The step of training the trainable database comprises: within the trainable database, storing a set of source samples as the set of indexes, wherein the set of source samples represent pixel colors of the source image; within the trainable database, storing a plurality of sets of candidate data values, a plurality of candidate data values in each set of candidate data values respectively corresponding to a plurality of indexes in the set of indexes; converting the set of source samples into a plurality of sets of target samples according to the plurality of sets of candidate data values, respectively, wherein each set of target samples represent pixel colors of a target image; utilizing the output device to output each set of target samples to generate output results of the sets of target samples; and according to comparison results between the output results of the sets of target samples outputted by the output device, selecting a set of candidate data values from the candidate data values stored in the trainable database as the plurality of data values corresponding to the set of indexes. The pixel color conversion method comprises: according to the plurality of data values corresponding to the set of indexes in the trainable database, converting source samples of another source image into target samples for being outputted by the output device.

While providing the pixel color conversion method mentioned above, the claimed invention further provides a pixel color conversion system applied to an output device. The pixel color conversion system comprises: a trainable database for storing a plurality of data values corresponding to a set of indexes for use performing pixel color conversion; and a processing circuit, coupled to the trainable database, for training the trainable database regarding at least one source image. The training of the trainable database comprises: within the trainable database, storing a set of source samples as the set of indexes, wherein the set of source samples represent pixel colors of the source image; within the trainable database, storing a plurality of sets of candidate data values, a plurality of candidate data values in each set of candidate data values respectively corresponding to a plurality of indexes in the set of indexes; converting the set of source samples into a plurality of sets of target samples according to the plurality of sets of candidate data values, respectively, wherein each set of target samples represent pixel colors of a target image; utilizing the output device to output each set of target samples to generate output results of the sets of target samples; and according to comparison results between the output results of the sets of target samples outputted by the output device, selecting a set of candidate data values from the candidate data values stored in the trainable database as the plurality of data values corresponding to the set of indexes. Wherein according to the plurality of data values corresponding to the set of indexes in the trainable database, the processing circuit is capable of converting source samples of another source image into target samples for being outputted by the output device.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

The present invention provides pixel color conversion methods and systems applied to output devices, where the scope of the output devices mentioned in the present invention is not limited to printers and multi-function printers (MFPs). The pixel color conversion methods and systems of the present invention are also applicable to other kinds of image/video output devices such as monitors and projectors.

Figure 1:
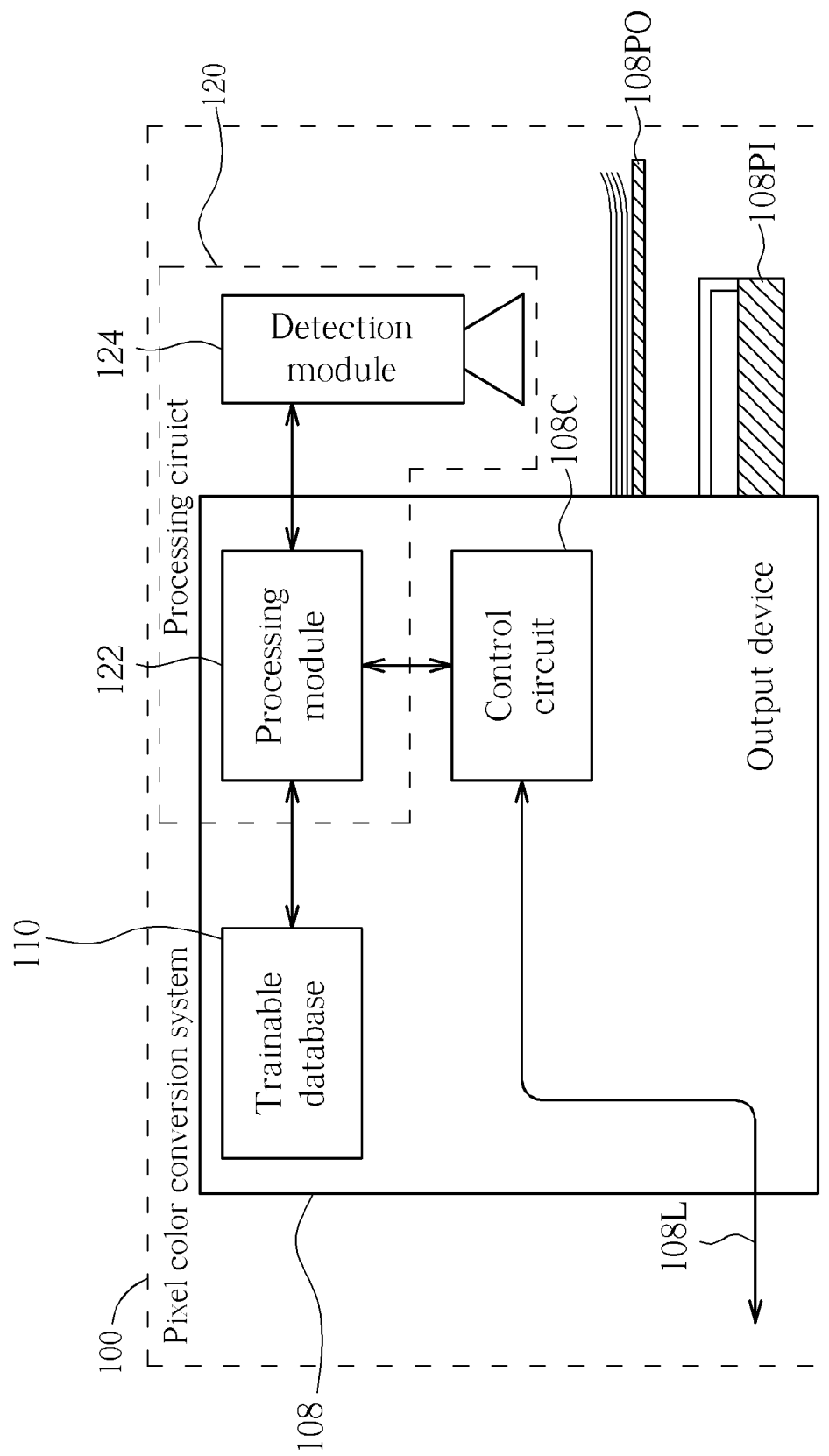
FIG. 1 is a diagram of a pixel color conversion system applied to an output device according to one embodiment of the present invention, where a portion of the pixel color conversion system is installed in the output device.

Please refer to FIG. 1. FIG. 1 is a diagram of a pixel color conversion system 100 applied to an output device 108 according to one embodiment of the present invention, where a portion of the pixel color conversion system 100 is installed in the output device 108. The pixel color conversion system 100 comprises a trainable database 110 and a processing circuit 120, and the processing circuit 120 comprises a processing module 122 and a detection module 124, where the trainable database 110 is utilized for storing a plurality of data values corresponding to a set of indexes for use performing pixel color conversion, and the processing circuit 120 is utilized for training the trainable database 110 regarding at least one source image.

According to this embodiment, the output device 108 is a printer or a MFP. As shown in FIG. 1, the output device 108 comprises a control circuit 108C, a cable 108L, a paper input module 108PI, and a paper output module 108PO, where the paper input module 108PI and the paper output module 108PO are partially shown in FIG. 1 and are respectively illustrated with the paper feeder and the paper output tray as representatives. The control circuit 108C is utilized for controlling operations of the output device 108, and further utilized for coupling to other devices through the cable 108L, so the output device 108 becomes a servo device of the other devices. For example, the control circuit 108C can be coupled to a personal computer (PC) or a local area network (LAN). It is noted that although the processing module 122 of this embodiment is an independent module differing from the control circuit 108C, this is not a limitation to the present invention. According to another embodiment of the present invention, the processing module 122 together with the trainable database 110 can be embedded in the control circuit 108C.

In the embodiment shown in FIG. 1, the pixel color conversion system 100 can be utilized for performing pixel color conversion of the output device 108. If the output device 108 receives a source image from the cable 108L for printing, the pixel color conversion system 100 is capable of converting source samples in the source image received from the cable 108L into target samples to adjust pixel colors of the source image, where the target samples represent pixel colors of a target image and can be utilized by the output device 108 for outputting. Thus, the output device 108 of this embodiment may print the target image whose pixel colors are adjusted.

Figure 2:
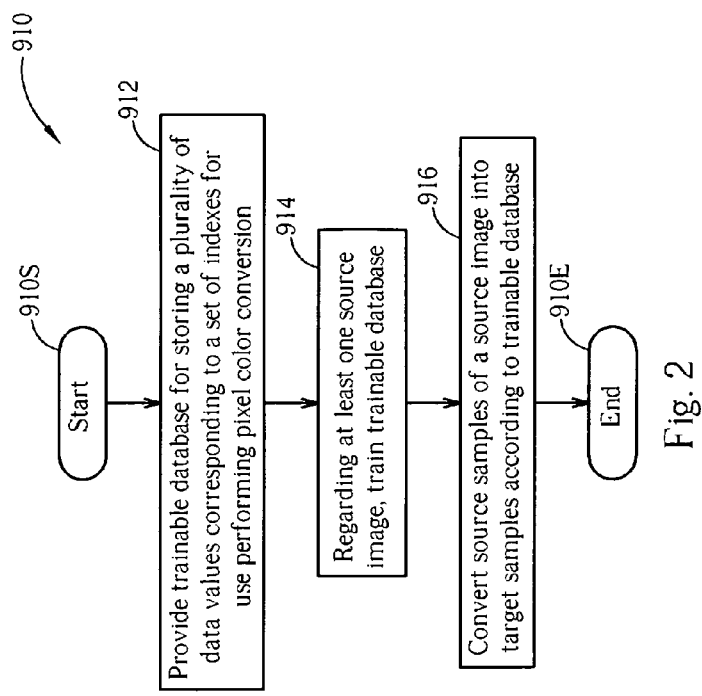
FIG. 2 is a flowchart of a pixel color conversion method applied to an output device according to one embodiment of the present invention.
Figure 3:
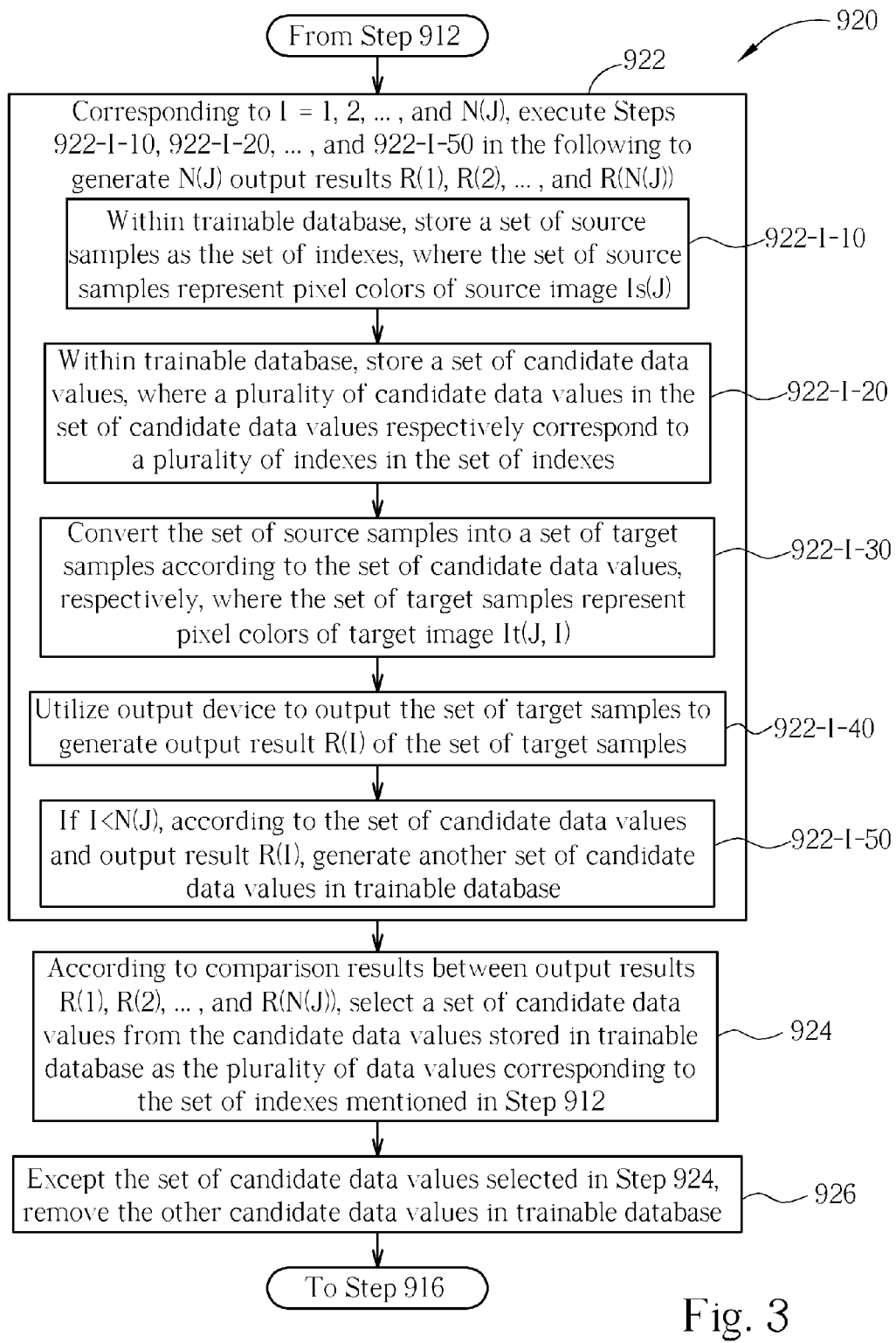
FIG. 3 is a flowchart of a method for performing the training step shown in FIG. 2 according to one embodiment of the present invention.

Please refer to FIG. 2 and FIG. 3. FIG. 2 is a flowchart of a pixel color conversion method 910 applied to an output device according to one embodiment of the present invention, and FIG. 3 is a flowchart of a method 920 for performing Step 914 shown in FIG. 2 according to one embodiment of the present invention, where both the pixel color conversion method 910 shown in FIG. 2 and the method 920 shown in FIG. 3 can be implemented with the pixel color conversion system 100 shown in FIG. 1, and described together as follows.

According to this embodiment, the pixel color conversion method 910 shown in FIG. 2 comprises the following steps.

Step 910S: Start.

Step 912: Within the output device 108, provide the trainable database 110 for storing a plurality of data values corresponding to a set of indexes for use performing pixel color conversion.

Step 914: Regarding at least one source image, the processing circuit 120 (more particularly, the processing module 122) trains the trainable database 110. According to this embodiment, this step trains the trainable database 110 regarding Ns source images Is(J), where J=1, 2, . . . , Ns. In this embodiment, the source images Is(J) include different color variations, single hue gradient variations, multiple hue gradient variations, or a combination of at least one portion of the variations mentioned above. For example, the source images Is(J) include cyan (C) gradient variations, magenta (M) gradient variations, yellow (Y) gradient variations, and black (K) gradient variations. According to one implementation choice of this embodiment, the source images Is(J) can be source images received from the cable 108L. According to another implementation choice of this embodiment, the source images Is(J) can be source images embedded in the pixel color conversion system 100 (e.g., the source images are embedded in the processing module 122). In addition, according to another implementation choice of this embodiment, the source images Is(J) can be generated according to a program code embedded in the processing module 122 when or before the processing circuit 120 trains the trainable database 110.

Step 916: The processing circuit 120 (more particularly, the processing module 122) converts source samples of a source image into target samples according to the plurality of data values corresponding to the set of indexes in the trainable database 110. According to this embodiment, the source image of this step can be a source image that a user would like to output, so the source image of this step is typically received from the cable 108L, and the contents of the source image of this step is typically different from those of the source images Is(J) mentioned in Step 914. In addition, the source image of this step can be a source image embedded in the pixel color conversion system 100. Thus, after the output device 108 outputs the target samples generated in this step to generate output results (which are the print results of the target samples in this embodiment), the output results can be utilized for checking whether the training results of Step 914 is normal or abnormal.

Step 910E: End.

According to this embodiment, the implementation details of Step 914 shown in FIG. 2 are illustrated as the steps shown in FIG. 3. For simplicity, the situation that the loop variable J is equal to a constant value (for example, one of J's possible values, 1, 2, . . . , or Ns) is first described as follows.

(From Step 912)

Step 922: Corresponding to I=1, 2, . . . , and N(J), execute the loop comprising Steps 922-I-10, 922-I-20, . . . , and 922-I-50 in the following N(J) times to generate N(J) output results R(1), R(2), . . . , and R(N(J)):

Step 922-I-10: Within the trainable database 110, store a set of source samples as the set of indexes, where the set of source samples represent pixel colors of the source image Is(J).

Step 922-I-20: Within the trainable database 110, store a set of candidate data values, where a plurality of candidate data values in the set of candidate data values respectively correspond to a plurality of indexes in the set of indexes.

Step 922-I-30: Convert the set of source samples into a set of target samples according to the set of candidate data values, respectively, where the set of target samples represent pixel colors of a target image It(J, I).

Step 922-I-40: Utilize the output device 108 to output the set of target samples to generate the output result R(I) of the set of target samples. In this embodiment, the output device 108 is a printer or a MFP, so this step utilizes the printer or the MFP to print the set of target samples to generate the print result of the set of target samples, where the output result R(I) represent the print result of the paper printed by the output device 108 and put on the paper output module 108PO.

Step 922-I-50: If I<N(J), according to the set of candidate data values and the output result R(I), generate another set of candidate data values in the trainable database 110. According to this embodiment, this step adjusts the set of candidate data values corresponding to the loop variable I according to the output result R(I) to generate another set of candidate data values corresponding to the next value (I+1). In addition, the present invention may utilize the detection module 124 to detect the output result R(I), and the detection module 124 of this embodiment is a measurement module for measuring the print result of the paper, which is printed by the output device 108 and put on the paper output module 108PO, as the output result R(I).

Step 924: According to comparison results between the output results R(1), R(2), . . . , and R(N(J)), select a set of candidate data values from the candidate data values stored in the trainable database 110 as the plurality of data values corresponding to the set of indexes mentioned in Step 912.

Step 926: Except the set of candidate data values selected in Step 924, remove the other candidate data values in the trainable database 110.

(To Step 916)

Figure 15:
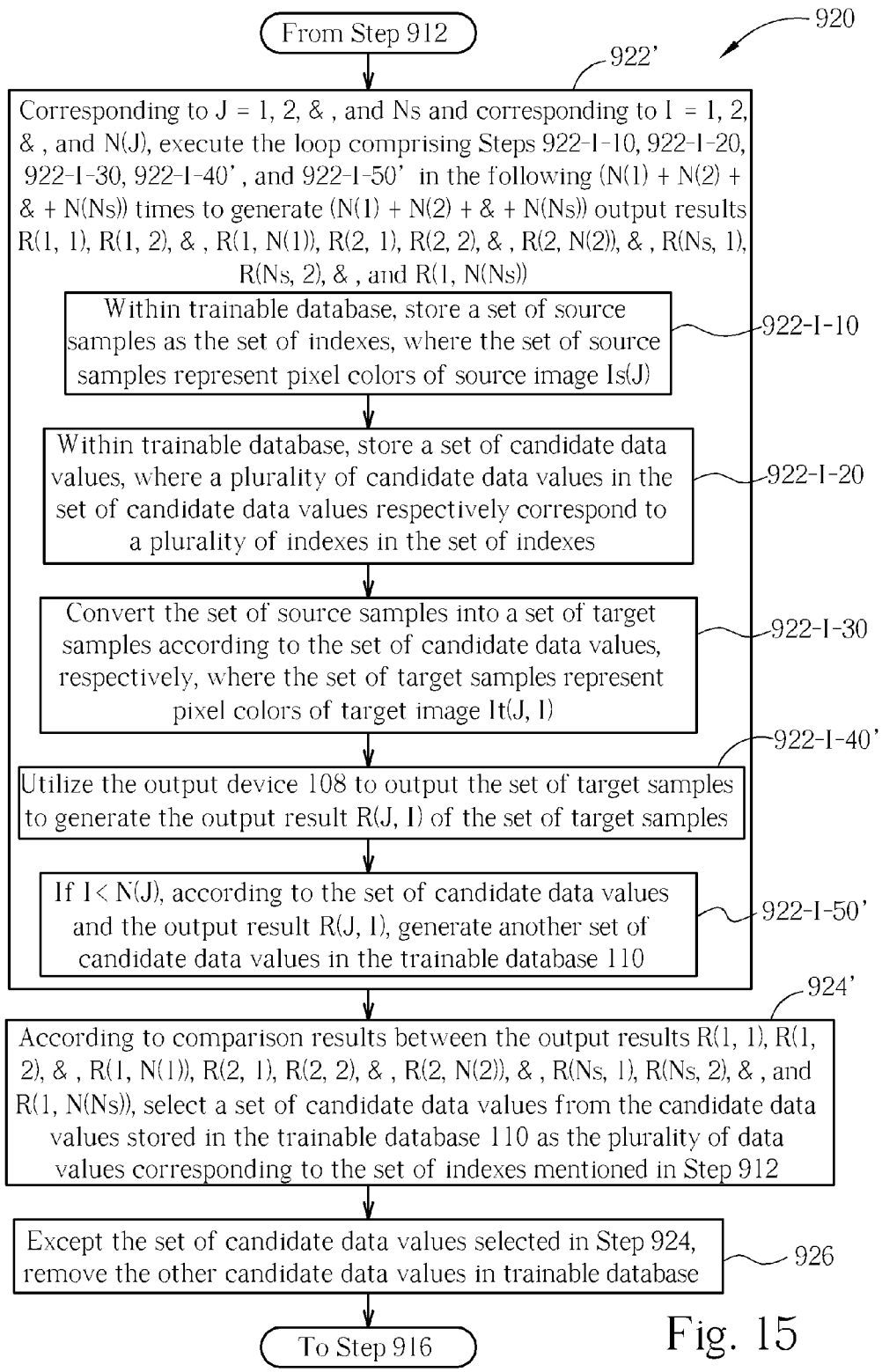
FIG. 15 is a flowchart of a method for performing the training step shown in FIG. 2 according to another embodiment of the present invention.

The situation that J varies within its possible values 1, 2, . . . , and Ns is further described in the following. J=1, 2, . . . , Ns represent that the loop comprising Step 922-I-10, Step 922-I-20, . . . , and Step 922-I-50 is executed (N(1)+N(2)+ . . . +N(Ns)) times, where R(I) mentioned in Step 922-I-40 and Step 922-I-50 are both replaced with R(J, I), and the other descriptions are similar to those mentioned above. Thus, Step 922 and Step 924 can be respectively replaced with Step 922' and Step 924', and Step 922-I-40 and Step 922-I-50 can be respectively replaced with Step 922-I-40' and Step 922-I-50', as shown in FIG. 15:

Step 922': Corresponding to J=1, 2, . . . , and Ns and corresponding to I=1, 2, . . . , and N(J), execute the loop comprising Steps 922-I-10, 922-I-20, 922-I-30, 922-I-40', and 922-I-50' in the following (N(1)+N(2)+ . . . +N(Ns)) times to generate (N(1)+N(2)+ . . . +N(Ns)) output results R(1, 1), R(1, 2), . . . , R(1, N(1)), R(2, 1), R(2, 2), . . . , R(2, N(2)), . . . , R(Ns, 1), R(Ns, 2), . . . , and R(1, N(Ns)):

Step 922-I-10: Within the trainable database 110, store a set of source samples as the set of indexes, where the set of source samples represent pixel colors of the source image Is(J).

Step 922-I-20: Within the trainable database 110, store a set of candidate data values, where a plurality of candidate data values in the set of candidate data values respectively correspond to a plurality of indexes in the set of indexes.

Step 922-I-30: Convert the set of source samples into a set of target samples according to the set of candidate data values, respectively, where the set of target samples represent pixel colors of a target image It(J, I).

Step 922-I-40': Utilize the output device 108 to output the set of target samples to generate the output result R(J, I) of the set of target samples.

Step 922-I-50': If I<N(J), according to the set of candidate data values and the output result R(J, I), generate another set of candidate data values in the trainable database 110.

Step 924': According to comparison results between the output results R(1, 1), R(1, 2), . . . , R(1, N(1)), R(2, 1), R(2, 2), . . . , R(2, N(2)), . . . , R(Ns, 1), R(Ns, 2), . . . , and R(1, N(Ns)), select a set of candidate data values from the candidate data values stored in the trainable database 110 as the plurality of data values corresponding to the set of indexes mentioned in Step 912.

As the source samples respectively utilized during the training corresponding to different source images Is(J) (i.e., the training corresponding to different values of the loop variable J) are not necessary the same, the number of source samples probably varies. In this situation, during the training mentioned above, the pixel color conversion method 910 and the pixel color conversion system 100 of the present invention may increase the number of indexes in the set of indexes mentioned in Step 912 according to the source samples corresponding to the then value of the loop variable J to expand the trainable database 110.

Figure 4:
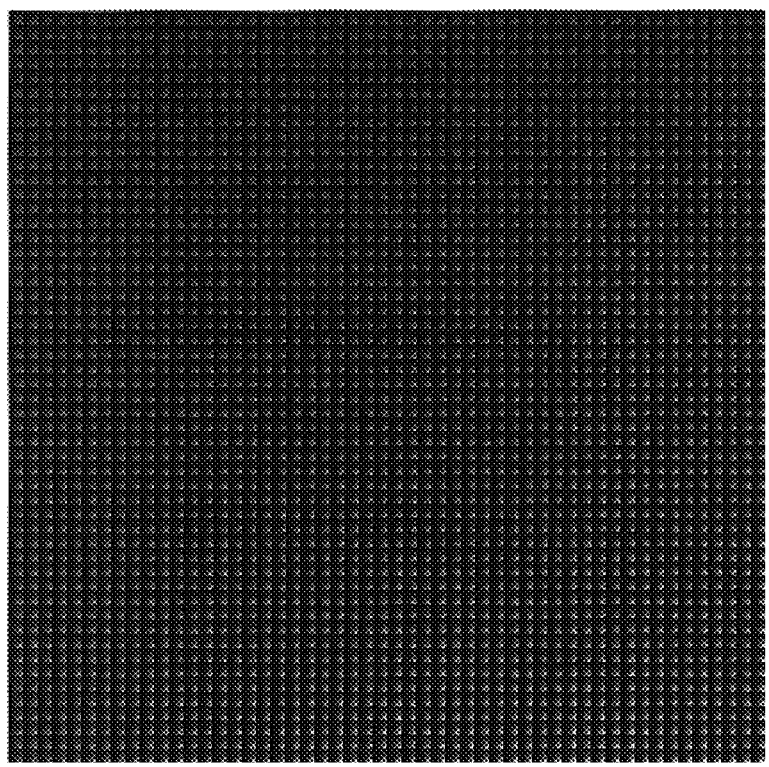
FIG. 4 is a diagram of a plurality of source samples having gradient variations and utilized while the training step shown in FIG. 2 is performed according to one embodiment of the present invention, where the source samples having the gradient variations comprise cyan (C), magenta (M), yellow (Y), and black (K) components, which are cyan image samples, magenta image samples, yellow image samples, and black image samples, respectively.
Figure 5:
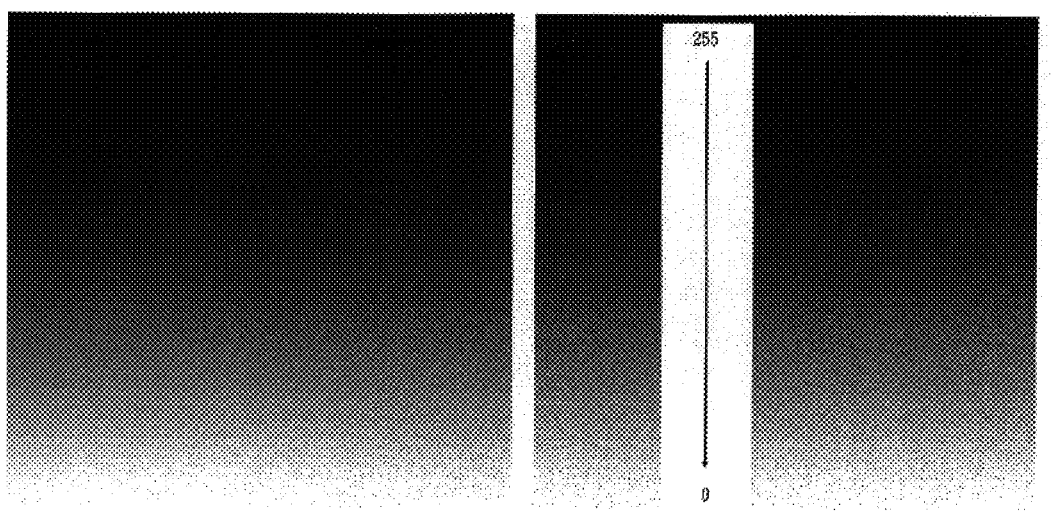
FIG. 5 illustrates the cyan image samples within the source samples of FIG. 4 by utilizing neutral color illustration.
Figure 6:
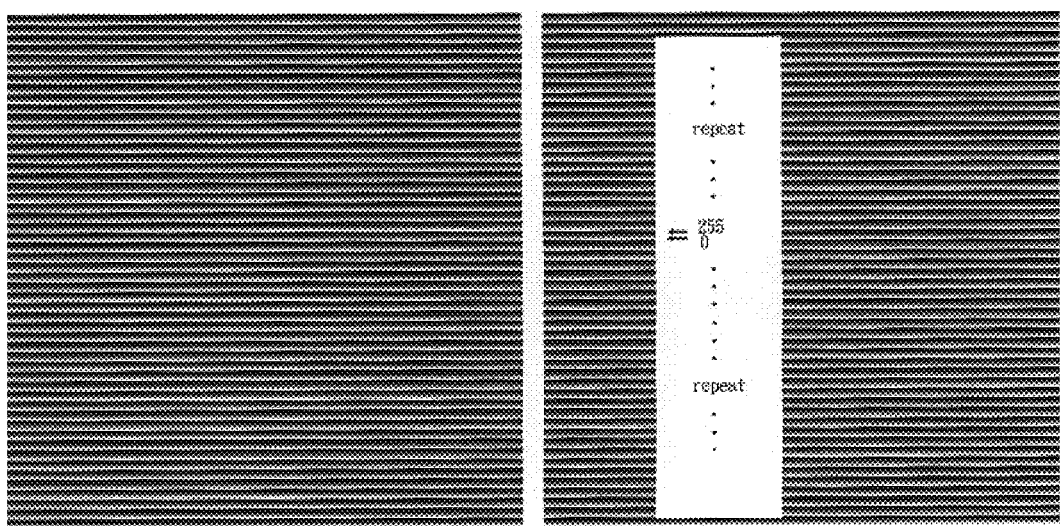
FIG. 6 illustrates the magenta image samples within the source samples of FIG. 4 by utilizing neutral color illustration.
Figure 7:
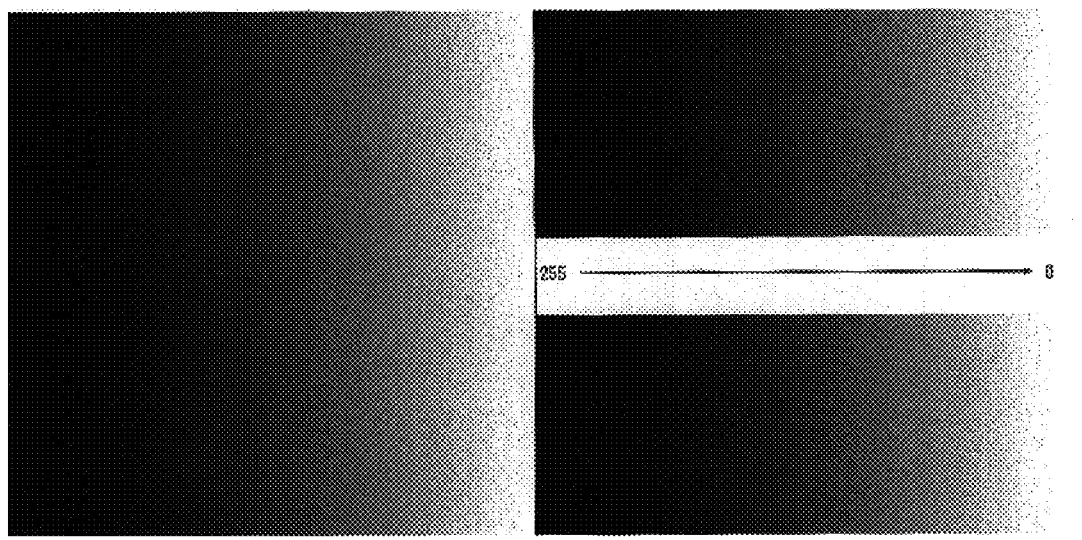
FIG. 7 illustrates the yellow image samples within the source samples of FIG. 4 by utilizing neutral color illustration.
Figure 8:
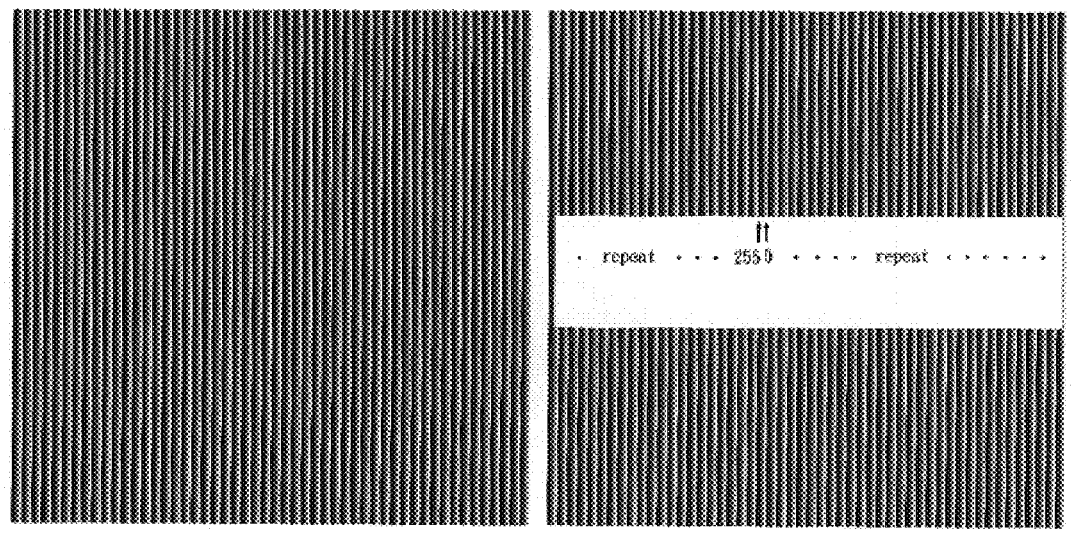
FIG. 8 illustrates the black image samples within the source samples of FIG. 4 by utilizing neutral color illustration.

FIG. 4 is a diagram of a plurality of source samples having gradient variations and utilized while Step 914 shown in FIG. 2 is performed according to one embodiment of the present invention. The source samples having the gradient variations comprise cyan (C), magenta (M), yellow (Y), and black (K) components, which are cyan image samples, magenta image samples, yellow image samples, and black image samples, respectively. More specifically, the image shown in FIG. 4 is a composed image with each of the (C, M, Y, K) proportions varies from 0% to 100% (or from 0 to 255, if represented by utilizing 8-bit values) and comprises various combinations of the (C, M, Y, K) proportions. For example, each of the (C, M, Y, K) proportions varies from 0 to 255 with 5 counts as units (i.e. the increment is equal to 5) and are therefore divided into 52 levels. As a result, the number of the combinations of the (C, M, Y, K) proportions totals to (52*52*52*52), which means 7,311,616 colors can be derived from the combinations mentioned above. FIG. 5 illustrates the image samples Gc corresponding to cyan gradient variations within the source samples mentioned above by utilizing neutral color illustration, FIG. 6 illustrates the image samples Gm corresponding to magenta gradient variations within the source samples mentioned above by utilizing neutral color illustration, FIG. 7 illustrates the image samples Gy corresponding to yellow gradient variations within the source samples mentioned above by utilizing neutral color illustration, and FIG. 8 illustrates the image samples Gk corresponding to black gradient variations within the source samples mentioned above by utilizing neutral color illustration.

Figure 9:
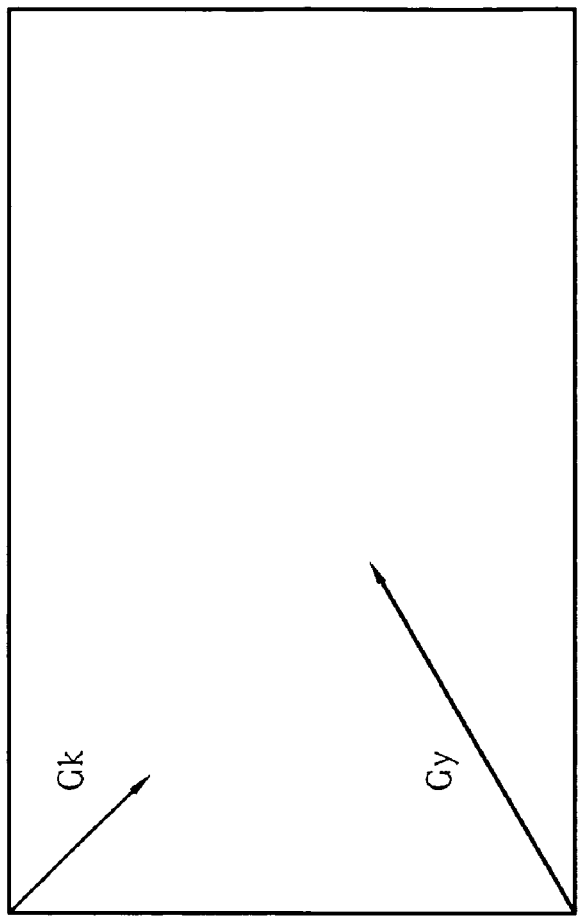
FIG. 9 illustrates the directions of gradient variations in the source image utilized while the training step shown in FIG. 2 is performed with the screen angle changed according to one embodiment of the present invention.
Figure 10:
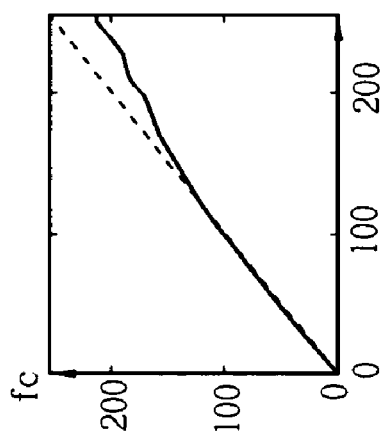
FIG. 10, FIG. 11, FIG. 12, and FIG. 13 illustrate functions utilized while the training step shown in FIG. 2 is performed according to one embodiment of the present invention.
Figure 11:
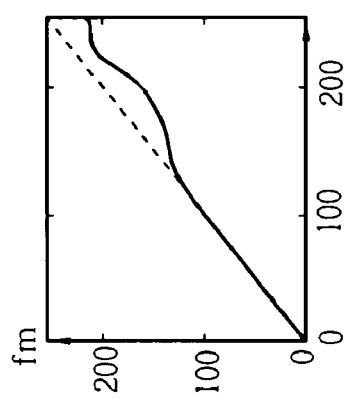
Figure 12:
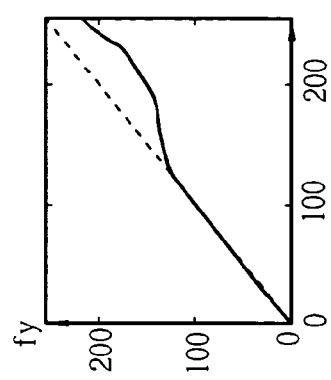
Figure 13:
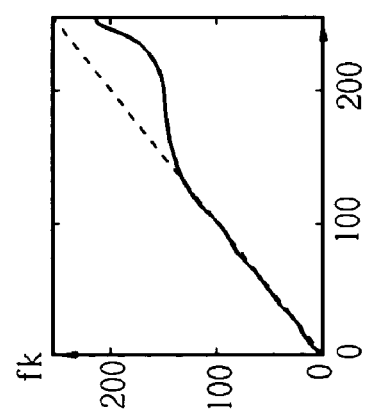

FIG. 9 illustrates the direction of gradient variations of the image samples Gk and the direction of gradient variations of the image samples Gy in the source image utilized while Step 914 shown in FIG. 2 is performed with the screen angle changed according to one embodiment of the present invention. In this embodiment, the direction corresponding to the image samples Gk represents the direction of the gradient variations corresponding to the color channel K in the source image, and the direction corresponding to the image samples Gy represents the direction of the gradient variations corresponding to the color channel Y in the source image.

During the training mentioned above, the pixel color conversion method 910 and the pixel color conversion system 100 of the present invention may detect whether a saturation output region exists in the gradient variations along a specific direction within the directions respectively corresponding to the image samples Gc, Gm, Gy, and Gk as shown by the output result of each set of target samples outputted by the output device 108 (e.g., R(I) or R(J, I) mentioned above), whereby the comparisons between the output results of the sets of target samples are performed. If the saturation output region is detected along the specific direction, the pixel color conversion method 910 and the pixel color conversion system 100 of the present invention may further detect the beginning location of the saturation output region along the specific direction, whereby the comparisons between the output results of the sets of target samples are performed. Thus, the present invention may select a set of candidate data values corresponding to the output result having greater dynamic range of the gradient variations along the specific direction and having no saturation output region with the selected set of candidate data values utilized as the plurality of data values corresponding to the set of indexes mentioned in Step 912, so as to optimize the pixel color conversion function of the output device 108.

FIG. 10, FIG. 11, FIG. 12, and FIG. 13 illustrate waveforms of functions fc, fm, fy, and fk utilized while Step 914 shown in FIG. 2 is performed according to one embodiment of the present invention, where the horizontal axis and the vertical axis in each of FIG. 10, FIG. 11, FIG. 12, and FIG. 13 respectively correspond to the source samples and the target samples, and the functions fc, fm, fy, and fk are respectively utilized for converting the (C, M, Y, K) proportions during the source/target sample conversion. That is, the functions fc, fm, fy, and fk are the transfer functions corresponding to the color channels C, M, Y, and K during the source/target sample conversion, respectively. In addition, for reference, the dashed lines in each of FIG. 10, FIG. 11, FIG. 12, and FIG. 13 represent the reference function of directly copying the source samples as target samples.

According to this embodiment, the functions fc, fm, fy, and fk are stored in the processing module 122, and the processing module 122 is capable of adjusting the functions fc, fm, fy, and fk according to the detected output results R(I) or R(J, I) mentioned above. Thus, regarding the same set of source samples, the processing module 122 is capable of generating the sets of target samples corresponding to the variations of the loop variable I in Step 922-I-30 in accordance with the adjustment of any of the functions fc, fm, fy, and fk. According to the present invention, if the training mentioned in Step 914 is completed and no more training is needed, the functions fc, fm, fy, and fk can be removed. For example, during manufacturing the output device 108, the functions fc, fm, fy, and fk are utilized for performing the training mentioned in Step 914 to optimize the pixel color conversion function of the output device 108. After the pixel color conversion function of the output device 108 is optimized, which means the training of the trainable database 110 is completed, then the functions fc, fm, fy, and fk can be removed from the processing module 122.

According to the descriptions disclosed above, the pixel color conversion method 910 and the pixel color conversion system 100 of the present invention may achieve very high efficiency of adjusting or calibrating the pixel color conversion ability of the output device 108 by automating the training of a trainable database 110.

According to a variation of the embodiment shown in FIG. 1, a user interface (not shown) is further provided in the pixel color conversion system 100, where the user interface is utilized for inputting the comparison results between the output results of the sets of target samples outputted by the output device 108, so Step 924 or Step 924' may select according to the inputted comparison results. The user interface can be installed inside or outside the output device 108, not hindering the implementation of the present invention. For example, the user interface can be implemented by utilizing a user interface ready to use on the output device 108, or implemented as a module coupled to the output device 108, or even implemented by utilizing a PC coupled to the output device 108. Thus, a user, a designer, or an operator of the production line of the output device 108 may input the comparison results. As a result, in addition to automatically training the trainable database 110, manually adjusting the trainable database 110 according to special or specific purposes is also available.

In addition, the usage of the user interface is not limited to inputting the comparison results. The user interface can also be utilized for inputting data to generate the another set of candidate data values mentioned in Step 922-I-50 or Step 922-I-50'. For example, by utilizing the user interface, the user may adjust the set of candidate data values corresponding to the loop variable I according to the output result R(J, I) to generate the another set of candidate data values corresponding to the next value (I+1).

According to this variation, no matter whether the output result R(I) is derived from detecting by utilizing the detection module 124 or derived from the user's visual decision, the implementation of the present invention is not hindered. Therefore, according to this variation, it may be unnecessary to install a detection module such as the detection module 124 within the processing circuit 120.

Figure 14:
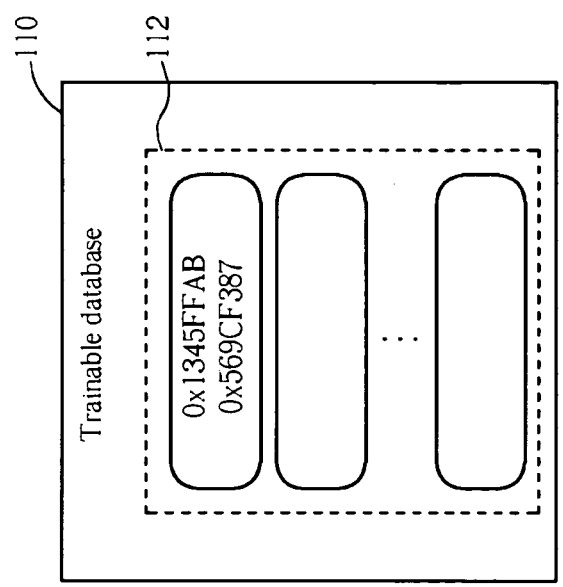
FIG. 14 is a diagram of a plurality of sets of data generated while the training step shown in FIG. 2 is performed according to one embodiment of the present invention, where each set of data comprise an index corresponding to four colors and data values corresponding to the index.

FIG. 14 is a diagram of a plurality of sets of data 112 generated while Step 914 shown in FIG. 2 is performed according to one embodiment of the present invention, where each set of data comprise an index corresponding to the color channels C, M, Y, and K and a data value corresponding to the index. For example, regarding the upmost set of data shown in FIG. 9, 0x1345FFAB represents the index, and 0x569CF387 represents the data value corresponding to the index. According to this embodiment, the 32 bits of the index are composed of four 8-bit values 0x13, 0x45, 0xFF, and 0×AB respectively corresponding to the color channels C, M, Y, and K, and the 32 bits of the data value corresponding to the index are composed of four 8-bit values 0x56, 0x9C, 0xF3, and 0x87 respectively corresponding to the color channels C, M, Y, and K. Thus, once a source sample matches the index 0x1345FFAB, the processing module 122 may convert the source sample into 0x569CF387 as the target sample corresponding to the source sample according to the set of data.

According to a variation of the embodiment shown in FIG. 1, the output device 108 is a monitor, and Step 922-I-40 or Step 922-I-40' utilizes the monitor to display the set of target samples to generate the display results of the sets of target samples, where the output results R(I) or R(J, I) represent the display results displayed by a display panel or a display module of the monitor.

According to a variation of the embodiment shown in FIG. 1, the output device 108 is a projector, and Step 922-I-40 or Step 922-I-40' utilizes the projector to display the set of target samples to generate the display results of the sets of target samples, where the output results R(I) or R(J, I) represent the display results of the image projected by the projector.

In contrast to the prior art, the present invention is capable of optimizing the pixel color conversion function of the output device by utilizing the trainable database. Therefore, the present invention fundamentally clears up the bottleneck in the prior art without encountering the prior-art side effects due to color replacement performed by utilizing technologies such as gray component replacement (GCR) and under color removal (UCR).

It is another advantage of the present invention that the present invention is capable of achieving very high efficiency of adjusting or calibrating the pixel color conversion ability of the output device by automating the training of the trainable database.

It is another advantage of the present invention that the present invention is capable of authorizing a user, a designer, or an operator of the production line to control the training of the trainable database during optimizing the pixel color conversion function of the output device by providing a user interface such as the user interface mentioned above within the output device. In addition, in the situation that the user interface is provided, even if no detection module such as the detection module mentioned above is installed in the processing circuit, it does not hinder the implementation of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A pixel color conversion method applied to an output device, comprising:

providing a trainable database for storing a plurality of data values corresponding to a set of indexes for use performing pixel color conversion;

regarding at least one source image, training the trainable database, comprising:

within the trainable database, storing a set of source samples as the set of indexes, wherein the set of source samples represent pixel colors of the source image;

within the trainable database, storing a plurality of sets of candidate data values, a plurality of candidate data values in each set of candidate data values respectively corresponding to a plurality of indexes in the set of indexes;

converting the set of source samples into a plurality of sets of target samples according to the plurality of sets of candidate data values, respectively, wherein each set of target samples represent pixel colors of a target image;

utilizing the output device to output each set of target samples to generate output results of the sets of target samples; and according to comparison results between the output results of the sets of target samples outputted by the output device, selecting a set of candidate data values from the candidate data values stored in the trainable database as the plurality of data values corresponding to the set of indexes;

according to the plurality of data values corresponding to the set of indexes in the trainable database, converting source samples of another source image into target samples for being outputted by the output device; and detecting the output result of each set of target samples outputted by the output device to perform comparisons between the output results of the sets of target samples wherein the source image has gradient variations along a specific direction, and the step of detecting the output result of each set of target samples outputted by the output device further comprises:

detecting whether a saturation output region exists in the gradient variations along the specific direction as shown by the output result of each set of target samples outputted by the output device when performing the comparisons between the output results of the sets of target samples.

2. The pixel color conversion method of claim 1, wherein the step of detecting the output result of each set of target samples outputted by the output device further comprises:

if the saturation output region is detected, detecting a beginning location of the saturation output region along the specific direction when performing the comparisons between the output results of the sets of target samples.

3. A pixel color conversion system applied to an output device, comprising:

a trainable database for storing a plurality of data values corresponding to a set of indexes for use performing pixel color conversion; and a processing circuit, coupled to the trainable database, for training the trainable database regarding at least one source image, the training of the trainable database comprising:
- within the trainable database, storing a set of source samples as the set of indexes, wherein the set of source samples represent pixel colors of the source image;
- within the trainable database, storing a plurality of sets of candidate data values, a plurality of candidate data values in each set of candidate data values respectively corresponding to a plurality of indexes in the set of indexes;
- converting the set of source samples into a plurality of sets of target samples according to the plurality of sets of candidate data values, respectively, wherein each set of target samples represent pixel colors of a target image;
- utilizing the output device to output each set of target samples to generate output results of the sets of target samples; and
- according to comparison results between the output results of the sets of target samples outputted by the output device, selecting a set of candidate data values from the candidate data values stored in the trainable database as the plurality of data values corresponding to the set of indexes;

wherein the processing circuit further comprises:
- a detection module, coupled to the processing circuit, for detecting the output result of each set of target samples outputted by the output device, whereby the processing circuit performs comparisons between the output results of the sets of target samples, wherein the source image has gradient variations along a specific direction, and the detection module detects whether a saturation output region exists in the gradient variations along the specific direction as shown by the output result of each set of target samples outputted by the output device, whereby the processing circuit performs the comparisons between the output results of the sets of target samples.

wherein according to the plurality of data values corresponding to the set of indexes in the trainable database, the processing circuit is for converting source samples of another source image into target samples for being outputted by the output device.

4. The pixel color conversion system of claim 3, wherein if the detection module detects the saturation output region, the detection module further detects a beginning location of the saturation output region along the specific direction, whereby the processing circuit performs the comparisons between the output results of the sets of target samples.

* * * * *